US012333894B2

(12) United States Patent
Shigeta

(10) Patent No.: US 12,333,894 B2
(45) Date of Patent: Jun. 17, 2025

(54) GAME MANAGEMENT SYSTEM TO TRACK GAME PLAY BY PLAYERS

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 18/123,626

(22) Filed: Mar. 20, 2023

(65) Prior Publication Data

US 2023/0230443 A1 Jul. 20, 2023

Related U.S. Application Data

(63) Continuation of application No. 16/284,437, filed on Feb. 25, 2019, now abandoned.

(30) Foreign Application Priority Data

Feb. 26, 2018 (JP) ................................ 2018-031469

(51) Int. Cl.
*G07F 17/32* (2006.01)

(52) U.S. Cl.
CPC ........ *G07F 17/322* (2013.01); *G07F 17/3206* (2013.01); *G07F 17/3225* (2013.01); (Continued)

(58) Field of Classification Search
CPC ............... G07F 17/3206; G07F 17/322; G07F 17/3225; G07F 17/3239; G07F 17/3241; (Continued)

(56) References Cited

U.S. PATENT DOCUMENTS 6,267,671 B1 7/2001 Hogan
8,092,293 B2 1/2012 Richards et al.
(Continued)

FOREIGN PATENT DOCUMENTS

CN 1519767 A 8/2004
CN 102125756 A 7/2011
(Continued)

OTHER PUBLICATIONS

European Search Report dated Aug. 7, 2019 issued in corresponding EP application 19159144.5.
(Continued)

*Primary Examiner* — Justin L Myhr
(74) *Attorney, Agent, or Firm* — NORTON ROSE FULBRIGHT US LLP

(57) ABSTRACT

A game management system that manages a casino game which is played in a casino facility includes: a camera that acquires an image by photographing bet game tokens; a control device that identifies a bet amount for each player position of a gaming table on the basis of a position, a type, and the number of game tokens in the image; a reader/writer device that identifies a player of each player position of the gaming table; and a point processing unit that stores a member ID of each player who is identified by the reader/writer device and a bet amount of each player position which is identified by the reader/writer device in a recording device in correlation with each other. The point processing unit has a function of giving points based on a bet amount of each player who is identified by the reader/writer device to the player.

20 Claims, 13 Drawing Sheets

(52) U.S. Cl.
CPC ...... *G07F 17/3239* (2013.01); *G07F 17/3241* (2013.01); *G07F 17/3244* (2013.01); *G07F 17/3248* (2013.01); *G07F 17/3255* (2013.01); *G07F 17/326* (2013.01)

(58) Field of Classification Search
CPC . G07F 17/3244; G07F 17/3255; G07F 17/326
See application file for complete search history.

(56) References Cited

U.S. PATENT DOCUMENTS

| | | | |
|---|---|---|---|
| 8,636,584 B2 | 1/2014 | Bryant et al. | |
| 9,189,918 B1 | 11/2015 | Gronkowski et al. | |
| 2002/0045478 A1 | 4/2002 | Soltys et al. | |
| 2002/0132663 A1 | 9/2002 | Cumbers | |
| 2003/0032474 A1 | 2/2003 | Kaminkow | |
| 2003/0036425 A1 | 2/2003 | Kaminkow et al. | |
| 2003/0199315 A1* | 10/2003 | Downes | G07F 17/3288 463/28 |
| 2004/0199787 A1 | 10/2004 | Hans et al. | |
| 2005/0014562 A1 | 1/2005 | Fujimoto | |
| 2005/0054446 A1 | 3/2005 | Kammler et al. | |
| 2005/0137005 A1 | 6/2005 | Soltys et al. | |
| 2006/0160600 A1 | 7/2006 | Hill et al. | |
| 2006/0177109 A1 | 8/2006 | Storch | |
| 2006/0205490 A1 | 9/2006 | Huber | |
| 2006/0240894 A1* | 10/2006 | Andrews | A63F 13/12 463/42 |
| 2007/0248281 A1 | 10/2007 | Super et al. | |
| 2008/0032797 A1* | 2/2008 | Harris | H04N 21/4781 463/40 |
| 2008/0039189 A1* | 2/2008 | Walker | G06Q 30/06 463/25 |
| 2008/0076529 A1 | 5/2008 | Richards et al. | |
| 2009/0075725 A1 | 3/2009 | Koyama | |
| 2009/0149247 A1 | 6/2009 | Esbensen et al. | |
| 2009/0253498 A1 | 10/2009 | Wolf et al. | |
| 2010/0240446 A1 | 9/2010 | Koyama et al. | |
| 2011/0127722 A1 | 6/2011 | Emori et al. | |
| 2011/0309577 A1 | 12/2011 | Vicens et al. | |
| 2013/0316797 A1 | 11/2013 | Gelinotte et al. | |
| 2014/0094312 A1* | 4/2014 | Wouhaybi | A63F 3/00006 463/42 |
| 2015/0065235 A1 | 3/2015 | Esmaili et al. | |
| 2015/0199872 A1 | 7/2015 | George et al. | |
| 2015/0294537 A1 | 10/2015 | Chujo | |
| 2016/0196723 A1 | 7/2016 | Ballman | |
| 2019/0005767 A1 | 1/2019 | Shigeta | |
| 2019/0362594 A1 | 11/2019 | Shigeta | |

FOREIGN PATENT DOCUMENTS

| | | |
|---|---|---|
| JP | 2002041705 A | 2/2002 |
| JP | 2004194898 A | 7/2004 |
| JP | 2005534417 A | 11/2005 |
| JP | 2008512186 A | 4/2008 |
| JP | 2009018021 A | 1/2009 |
| JP | 2010128915 A | 6/2010 |
| JP | 2010213940 A | 9/2010 |
| JP | 2013172932 A | 9/2013 |
| JP | 2016045819 A | 4/2016 |
| JP | 2017136347 A | 8/2017 |
| JP | 2018020103 A | 2/2018 |
| WO | 2004013820 A2 | 2/2004 |
| WO | 2006031431 A1 | 3/2006 |
| WO | 2014064797 A1 | 5/2014 |
| WO | 2018025752 A1 | 2/2018 |

OTHER PUBLICATIONS

Australian Examination Report No. 1 dated Jan. 7, 2020 issued in corresponding AU application 2019201347.
Macao Office Action dated Feb. 24, 2020 issued in corresponding MO application I/001604.
International Search Report dated May 14, 2019 issued in corresponding PCT application PCT/JP2019/005468.
Casino University, "What is the meaning of comp heard in the casino?, What is the meaning of comp and what kind of comp services there are?", Internet <URL:https://casinouniv.com/dhCFC> retrieved on Apr. 24, 2019, Published on May 23, 2017.
Chinese Office Action dated Nov. 30, 2020 issued in CN application 201910142160.2.
US Office Action dated May 31, 2022 issued in U.S. Appl. No. 16/975,508.
Japanese Office Action dated Dec. 13, 2022 issued for JP application JP2019-025004.
Japanese Office Action dated May 16, 2023 issued in JP application 2019-025004.
Japanese Office Action issued on Dec. 17, 2024, issued in JP Application No. 2023-178857.
U.S. Office Action issued on Jan. 16, 2025, issued in U.S. Appl. No. 17/991,027.
Australian Examination Report No. 2 issued on Jan. 23, 2025, issued in AU Application No. 2023201679.

* cited by examiner

Fig. 10

| |
|---|
| MEMBER INFORMATION |
| MEMBER ID |
| HELD POINTS |
| LATEST BALANCE |
| ACQUIRED POINTS IN THREE LATEST DAYS |
| ACQUIRED POINTS IN ONE LATEST MONTH |
| ACQUIRED POINTS IN ONE LATEST YEAR |
| PLAY RESULT (START TIME: END TIME: BET AMOUNT: BALANCE) |
| PLAY RESULT (START TIME: END TIME: BET AMOUNT: BALANCE) |
| PLAY RESULT (START TIME: END TIME: BET AMOUNT: BALANCE) |
| ⋮ |

Fig. 11

| |
|---|
| NUMBER OF CONSUMPTION POINTS: INCENTIVE: OFFERING CONDITION |
| NUMBER OF CONSUMPTION POINTS: INCENTIVE: OFFERING CONDITION |
| NUMBER OF CONSUMPTION POINTS: INCENTIVE: OFFERING CONDITION |
| •<br>•<br>• |

GAME MANAGEMENT SYSTEM TO TRACK GAME PLAY BY PLAYERS

CROSS REFERENCE TO RELATED APPLICATION

This application is a continuation of U.S. patent application Ser. No. 16/284,437 filed Feb. 25, 2019, which claims priority to JP Pat. App. No. 2018-031469 filed Feb. 26, 2018, the entire contents of each disclosure are hereby incorporated by reference.

FIELD

The present disclosure relates to a game management system for managing casino games which are played in casino facilities.

BACKGROUND

In the related art, a point service of offering a point when a client participates in a game has been provided as a part of a measure for keeping clients for the purpose of an increase in profits of a casino manager (a game promoter) in casino facilities. In this point service, a client can acquire an incentive when the client collects points.

Specifically, a client first registers a member in a casino facility and then a member ID is given to the client. The member ID is stored in a member card which is carried by the client. The casino manager ascertains a time in which the client sits in a table and offers points corresponding to the time by reading the member card of the client when the client arrives at the table and when the client leaves the table. The offered points are records in a recording device of the casino facility in correlation with the member ID of the client. The casino manager consumes the points recorded in the recording device to offer an incentive to the client.

In the point service according to the related art, points are offered according to the time in which a client sits in a table, but the client does not necessarily participate (perform betting) in all games even when the client sits in the table and may participate in a game sometimes while watching a game in which other clients participate. Accordingly, points are offered to a client who hardly participates in games and does not contribute to sales of the casino manager, which causes a loss of the casino manager.

SUMMARY

It is conceivable that points are offered according to an actual bet amount of a client. However, in this case, a dealer or a pit manager needs to manually input a bet amount whenever a client performs betting. Accordingly, an input miss or input omission is likely to occur. When a client claims that reasonable points are not offered for a bet amount, it cannot be verified and thus a casino manager has to offer points in response to the client's claim. There may be a client with malice who makes such a claim and thus the loss of the casino manager may be severely large.

Therefore, an objective of the present disclosure is to provide a game management system that can reliably offer points corresponding to a bet amount of each player.

According to an aspect of the present disclosure, there is provided a game management system that manages a casino game which is played in a casino facility, the game management system including: a gaming table in which a game is played using game tokens; an information processing device that identifies a bet amount for each player position of the gaming table on the basis of a position, a type, and the number of game tokens which have been bet; a player identifying unit that identifies a player who participates in a game at each player position of the gaming table; and a point processing unit that stores a member ID of each player who is identified by the player identifying unit and a bet amount of each player position which is identified by the information processing device in a database in correlation with each other, in which the point processing unit has a function of giving points based on a bet amount of each player who is identified by the player identifying unit to the player.

With this configuration, it is possible to reliably offer points based on a bet amount of a player. Note that, the information processing device may ascertain the position, the type, and the number of the game tokens on the basis of the image acquired by photographing the bet game tokens or may ascertain the position, the type, and the number of game tokens using other means.

The game management system may further include a game result determining device that is able to determine a result of a game, and the point processing unit may be configured to ascertain winning/losing and a balance of each player on the basis of information of the bet amount of each player and information of the game result determined by the game result determining device.

The game management system may further include a game token tray that accommodates the game tokens, and the information processing device may be configured to determine a total amount of the game tokens in the game token tray and to compare a total amount of the balance of each player with a total increase/decrease amount of the game token tray before and after settlement of the game tokens.

In the game management system, the point processing unit may be configured to offer points to the players when the total increase/decrease amount of the game token tray before and after settlement of the game tokens and the total amount of the balance of the players match each other as a result of comparison.

With this configuration, it is possible to ascertain that payment or collection of game tokens has been accurately performed by settlement and then to offer points.

In the game management system, the player identifying unit may be a face authentication system.

With this configuration, a player does not need to perform a particular action such as presentation of a member card for identifying the player and a player (a member) in each player position can be easily identified.

In the game management system, the player identifying unit may be a reader device that is carried by each player and reads the member ID from a storage medium in which the member ID is stored.

With this configuration, it is possible to reliably identify a player.

In the game management system, the point processing unit may have a function of ascertaining a start time and an end time at which each player participates in a game in the gaming table and storing the start time and the end time in the database.

With this configuration, it is possible to ascertain the time in which a player participates actually in a game in addition to an actual bet amount.

In the game management system, the point processing unit may have a function of calculating a bet amount of each player for each game.

With this configuration, it is possible to ascertain a bet amount of each player for each game.

The game management system may further include an incentive processing unit that provides an incentive on the basis of the bet amount which is accumulated every month or every year.

With this configuration, it is possible to offer an incentive on the basis of the points accumulated every month or every year.

The game management system may further include an incentive processing unit that provides an incentive on the basis of a bet amount which is accumulated every successive days.

With this configuration, it is possible to offer an incentive on the basis of the points accumulated every successive days (for example, three days).

According to another aspect of the present disclosure, there is provided a game management system including a player identifying unit that identifies a player who participates in a game in a casino facility; a camera that acquires an image by photographing game tokens which each player has bet in the game; an information processing device that identifies a bet amount of each player in the game on the basis of the image; and a recording unit that records points of each player according to the bet amount identified by the information processing device.

With this configuration, it is also possible to reliably offer points based on a bet amount of each player.

In the game management system, the recording unit may be a storage medium which is carried by each player.

With this configuration, a player can request an incentive by consuming points using the storage medium.

In the game management system, the recording unit may be a database in which the points for each player are stored for a plurality of players.

With this configuration, a player does not need to have a storage medium in order to collect points or to request an incentive by consuming points. A problem with counterfeit of such a storage medium is prevented.

The game management system may further include an incentive offering device that offers an incentive to each player according to the points stored in the recording unit.

With this configuration, a player can enjoy scoring based on the points which are held by the player.

In the game management system, the point processing unit may manage a plurality of gaming tables, ascertain a total bet amount for each player, a net profit of each player, or a net profit of a game promoter in a predetermined time or period, offer points or a status to each player under a predetermined condition on the basis of the total bet amount, the net profit of each player, or the net profit of the game promoter, and output the offered points or status.

With this configuration, the accumulation of the total bet amount or the net profit of each player or the net profit of the game promoter in a plurality of gaming tables are ascertained and points or status is offered accordingly.

In the game management system, the predetermined time or period may be a day, successive days, or a month.

With this configuration, for example, points or status is offered to a player on the basis of the total bet amount a day.

In the game management system, the point processing unit may additionally offer the points or status when points are collectively offered in the predetermined time or period.

With this configuration, it is possible to offer an incentive by collectively collecting points for a short period of time.

In the game management system, the point processing unit may offer a right to enter a VIP room on the basis of the points or status.

With this configuration, an incentive of the right to enter a VIP room can be offered. Note that, the point processing unit may offer a right to enter a VIP room when the points or status reaches a predetermined reference value.

In the game management system, the points or status may be able to be exchanged for unrealizable game tokens.

With this configuration, it is possible to offer an incentive of exchange for unrealizable game tokens. Note that, the points or status and the unrealizable game tokens may be exchanged in accordance with a predetermined exchange rate.

In the game management system, the points or status may be able to be used for paying a usage fee for a hotel or a predetermined facility.

With this configuration, it is possible to offer an incentive of use of a hotel or a predetermined system.

In the game management system, the point processing unit may output the total bet amount of each player as credit information of the player.

With this configuration, it is possible to acquire credit information based on the total bet amount.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 10 is a diagram illustrating information of each member which is recorded on a recording device in the second embodiment;

FIG. 11 is a diagram illustrating a relationship between incentives, the numbers of consumed points, and offering conditions which are stored in the recording device in the second embodiment;

DETAILED DESCRIPTION OF NON-LIMITING EXAMPLE EMBODIMENTS

When a game concludes, a dealer picks up the game tokens bet by players and pays out the game tokens for the players according to a game result and details of the bets (such as a bet target and a bet amount) of each player. Preferably, whether or not this collection and payout (hereinafter, the collection and the payout will be collectively referred to as "settlement") has been accurately performed is determined at the time of the settlement to allow the players and the dealer to clearly recognize it.

In this regard, this embodiment provides a system for displaying accuracy of settlement at the time of the game token settlement subsequent to the end of the game.

Figure 1:
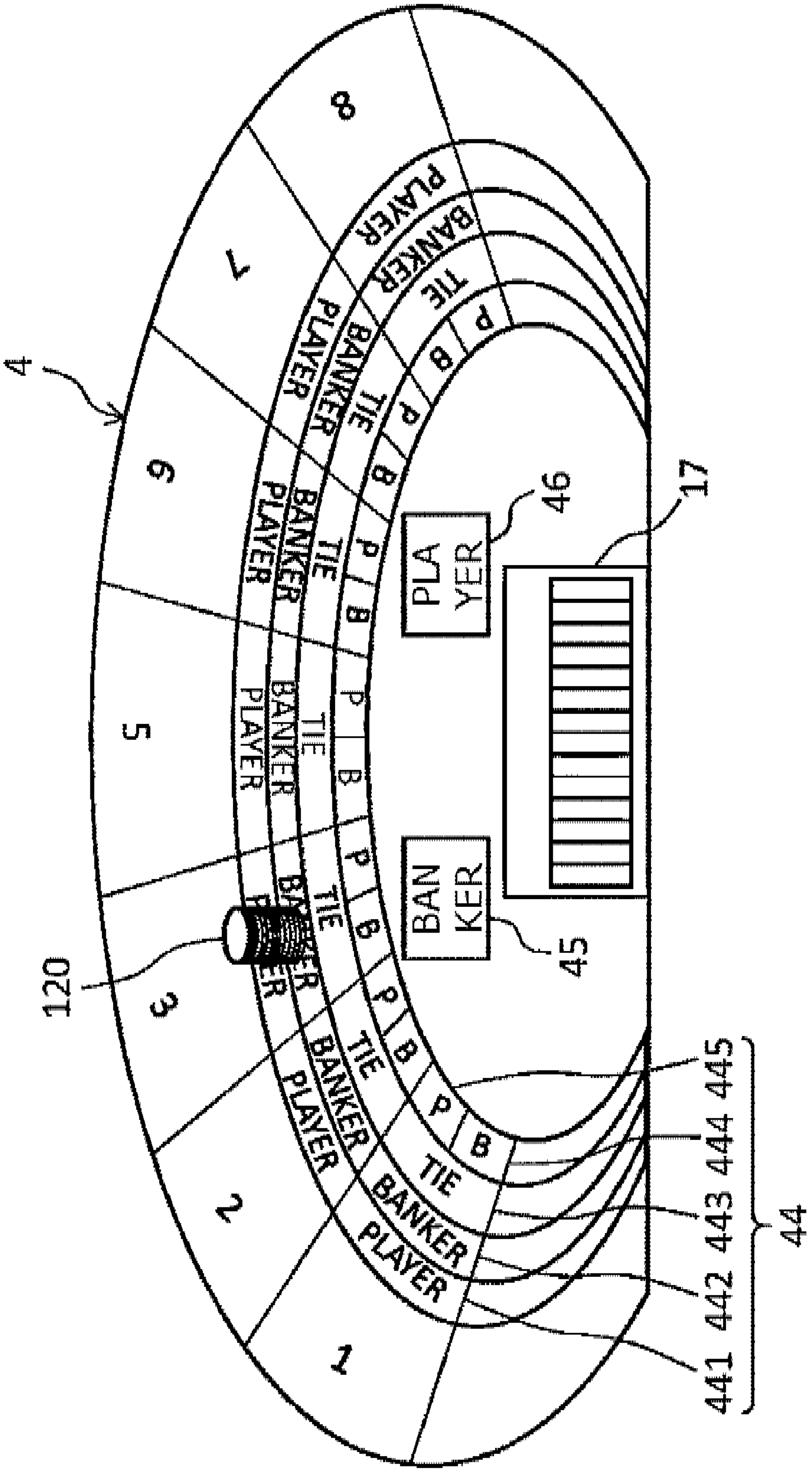
FIG. 1 is a plan view illustrating a gaming table according to a first embodiment.
Figure 2:
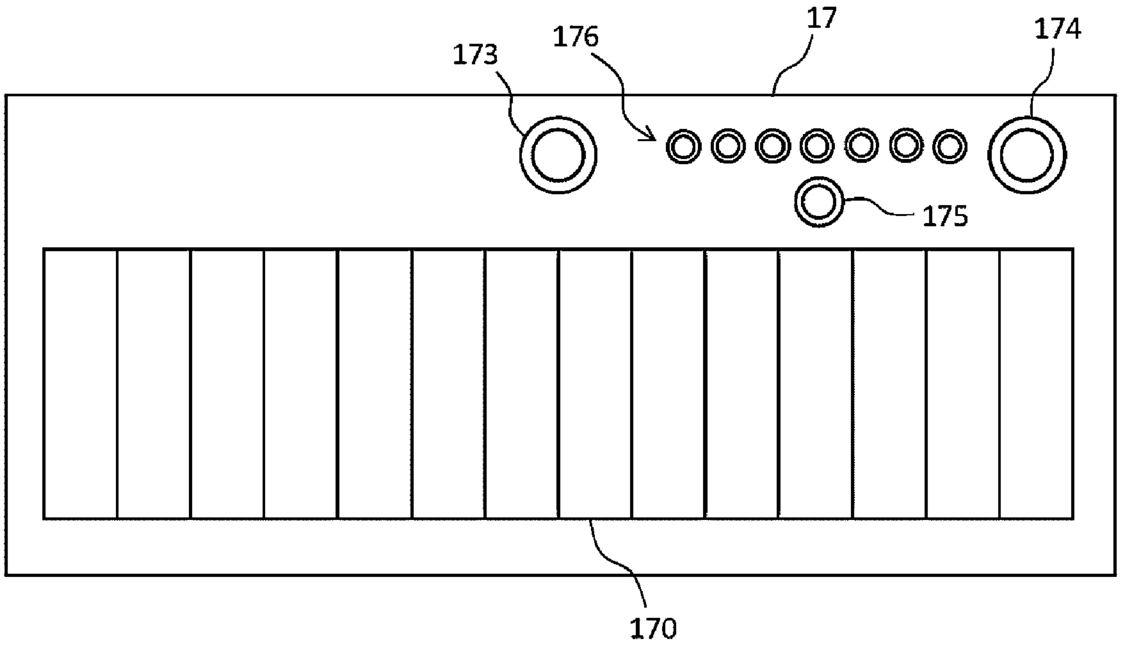
FIG. 2 is a plan view illustrating a game token tray according to the first embodiment.
Figure 3:
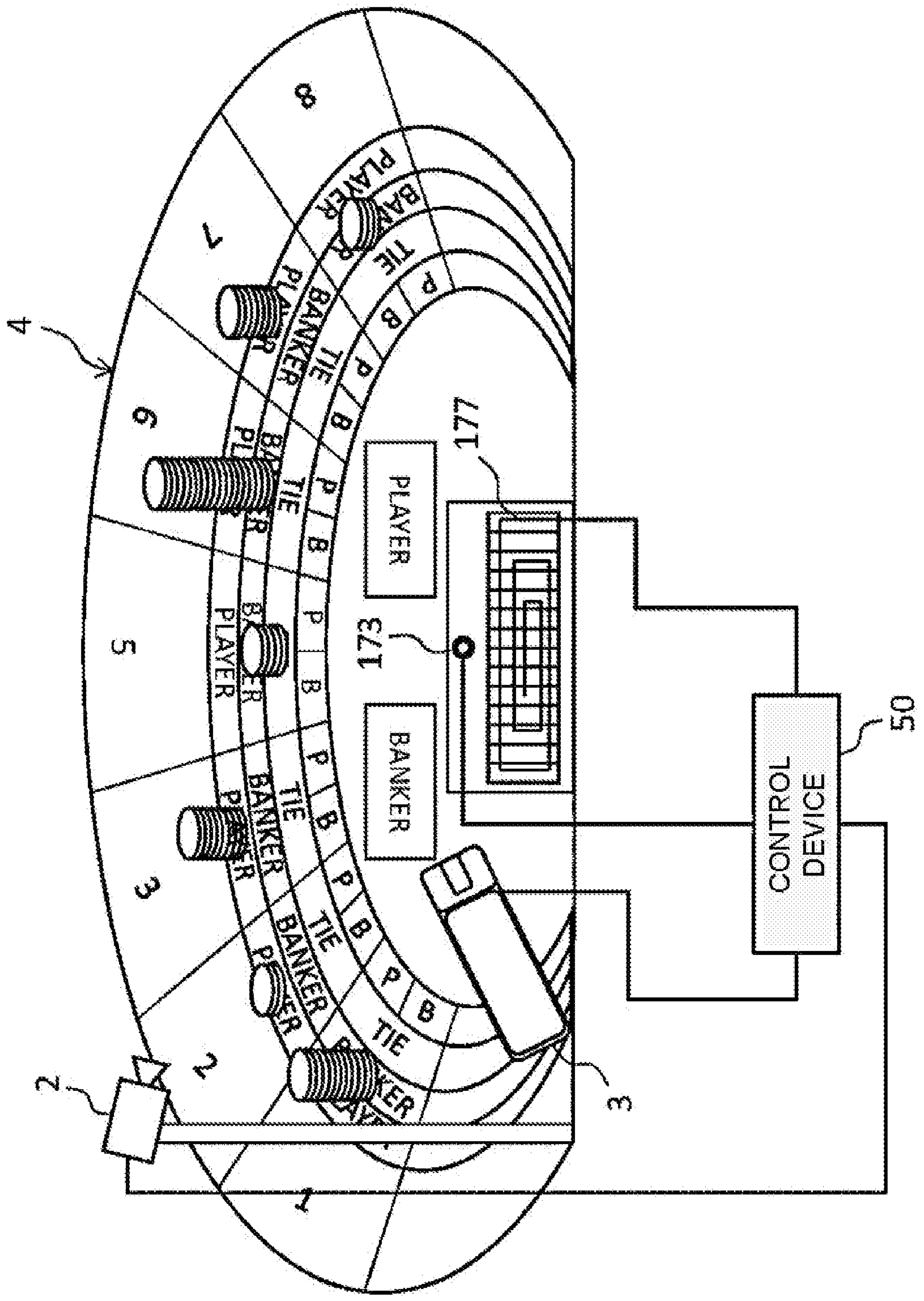
FIG. 3 is a diagram illustrating a configuration of a game token management system according to the first embodiment.

FIG. 1 is a plan view illustrating a gaming table according to this embodiment. FIG. 2 is a plan view illustrating a game token tray according to this embodiment. FIG. 3 is a diagram illustrating a whole configuration of a game token management system including the game token tray.

The gaming table 4 is a baccarat table around which respective bet areas 44 are provided for seven players. The bet area 44 of each player includes a player area (PLAYER) 441, a banker area (BANKER) 442, a time area (TIE) 443, a player pair area (P) 444, and a banker pair area (B) 445. Each player performs betting by placing game tokens of the bet amount in a position corresponding to the bet target. In addition, the gaming table 4 includes a player card area 45 where the drawn player cards are placed and a banker card area 46 where the drawn banker cards are placed.

A game token tray 17 for allowing the dealer to store game tokens is provided in front of a dealer position of the gaming table 4. At least a part of the game token tray 17 is buried in the gaming table 4.

The game token 120 used in this embodiment has the same configuration as those of the first to third embodiments. That is, the game token 120 has a symbol, a pattern, or a color by which a type (value) can be identified from each of the front and side faces. In addition, the game token 120 has at least an RFID embedded to store information for identifying the type.

A camera device 2 is provided over the gaming table 4 to photograph the bet area 44. The gaming table 4 according to this embodiment has seven player positions ("1", "2", "3", "5", "6", "7", and "8" in FIG. 1) for allowing participation of seven players. The camera device 2 photographs the bet areas 44 of all player positions. Note that the bet areas 44 of all the player positions may not be photographed by a single camera device 2, or all the bet areas 44 may be photographed by a plurality of camera devices 2 in a distributed manner.

The management control device 50 has all the functions described in the first to third embodiments. The management control device 50 specifies a position (bet target), a type, and the number of the game tokens placed in the bet area on the basis of the image photographed by the camera device 2. A device such as the camera device 2 and the management control device 50 functions as a measurement device or a bet determination device for measuring the position, the type, and the number of the game tokens on the gaming table 4, and its configuration and function are similar to those of the camera device 2 and the image analysis device 12 of the first embodiment.

The card distribution device 3 also has a configuration and a function similar to those of the first embodiment. That is, the card distribution device 3 determines a game winning/losing result on the gaming table 4 and displays it on a result indicator lamp. In addition, the card distribution device 3 transmits the determined game winning/losing result to the management control device 50. The management control device 50 has a function of recognizing the position, the type, and the number of the game tokens on the gaming table 4 and performing a balance count for the casino side on the gaming table 4 using a winning/losing result obtained from the card distribution device 3 as a winning/losing determination device.

On the basis of details of the betting determined from the image of the camera device 2 and the information regarding the winning/losing result obtained from the card distribution device 3, the management control device 50 recognizes, by calculation, the amount of the game tokens to be collected by the casino side on the gaming table 4 in the corresponding game and the amount of the game tokens to be paid out by the casino side, and compares each of them with the amount of the game tokens actually increasing in the game token tray 17 through the collection and the amount of the game tokens actually decreasing in the game token tray 17 through the payout.

The management control device 50 reads the RFID of the game token 120 stored in the game token tray 17 at a predetermined time interval and stores the read information when a change occurs. On the basis of the stored information, the management control device 50 compares the type and the number of the game tokens at the past time point and the type and the number of the game tokens at the current time point, and calculates a change amount of the game tokens 120 in the game token tray 17.

As illustrated in FIG. 2, the game token tray 17 has a storing portion 170 and indicator lamps 173 to 176. The storing portion 170 has a plurality of columns, and each column is configured to store the game tokens by stacking them in a thickness direction. As illustrated in FIG. 3, an antenna 177 is disposed under the storing portion 170.

The indicator lamp 173 displays whether or not a balance between the collected amount and the paid amount is correct. The indicator lamp 174 displays whether or not a total amount of the collected game tokens is correct, and whether or not a total amount of the paid game tokens is correct. The indicator lamp 175 displays whether or not the collection amount or the payout amount of the game tokens bet on the pair is correct.

A total of seven indicator lamps 176 are provided to match the seven player positions. In the collection stage, an indicator lamp 176 corresponding to the player whose game tokens are to be collected (loser in the game) is turned on. In the payout stage, an indicator lamp corresponding to the player who has to get the game tokens (winner in the game) is turned on. Note that, in FIG. 3, only the indicator lamp 173 is illustrated as a representative of the indicator lamps 173 to 176, and the other indicator lamps 174 to 176 are not illustrated for simplicity purpose.

The management control device 50 controls switching on/off operations of the indicator lamps 173 to 176 in order to display the comparison result (match or mismatch). The game token management system according to this embodiment checks whether or not the settlement of the game tokens is appropriately performed in real time using the indicator lamps 173 to 176. The game token management system according to this embodiment also checks, in real time, whether or not a wrongful game token is included in the collected game tokens.

First, the management control device 50 specifies a player who participates in the game on the gaming table 4 and associates the participating player with the player position number ("1", "2", "3", "5", "6", "7", and "8") of the gaming table 4. Specifically, the management control device 50 can identify a player of each player position using a face authentication system or a membership card.

When a game concludes, the management control device 50 checks the game tokens to be collected by the dealer (winning chips of the casino side) for each player on the basis of the game result, and turns on the indicator lamp 176 corresponding to the player position to be collected. As a result, the dealer can recognize where the game tokens are to be collected out of the player positions.

When a game concludes, first, a dealer picks up all of the game tokens to be collected from the bet area of the loser (collection stage), and then pays out the game tokens for the winner (payout stage). In the collection stage, the dealer stores the game tokens collected from the bet area of the gaming table 4 in the storing portion 170 of the game token tray 17 by checking the indicator lamp 176. Specifically, the dealer stores the collected game tokens in any two right columns serving as a collecting portion in order of the player position number.

Whenever the dealer picks up the game tokens from the bet area 41 and stores them in the collecting portion of the storing portion 170, the management control device 50 determines whether or not the game tokens are collected from the bet area 44 and the amount of the collected game tokens on the basis of the image from the camera device 2. In addition, the management control device 50 determines the amount of the game tokens stored in the collecting portion (increase amount) on the basis of the radio waves received via the antenna 177. Note that, although the two columns of the right side out of fourteen columns serve as the collecting portion of the storing portion 170 in this embodiment, the collecting portion for storing the collected game tokens may be, for example, a horizontal collection game token tray 171 or a collection game token tray 171 separated from the other columns.

Here, the management control device 50 obtains, for each player, the increase amount by calculating a difference of the total amount of the game tokens of the storing portion 170 before and after the collection using the RFID. In this manner, the management control device 50 that determines the amount of the game tokens held in the storing portion 170 by reading the information of their types (values) from the RFIDs of the game tokens held in the storing portion 170 corresponds to a dealer chip determination device according to the present invention.

The management control device 50 determines whether or not the actual collection amount determined on the basis of the image from the camera device 2 (image-based collection amount), the increase amount of the game tokens in the collecting portion determined on the basis of the radio wave received from the antenna 177 (RFID-based collection amount), and the collection amount calculated on the basis of the game result and details of the bets of the losers (calculation-based collection amount) match each other.

If the image-based collection amount, the RFID-based collection amount, and the calculation-based collection amount match each other, the management control device 50 turns off the corresponding indicator lamp 176. The dealer can recognize that collection of the game tokens from the players is accurately completed by checking the turn-off state of the indicator lamp 176.

Meanwhile, in a case where the image-based collection amount, the RFID-based collection amount, and the calculation-based collection amount do not match, the indicator lamp 176 remains in the turn-on state. Therefore, the dealer can recognize whether or not the collection of the game tokens from the corresponding player is accurately completed, or whether or not there is a wrongful game token in the collected game tokens.

If the collection of the game tokens described above is completed for all the losers, all the indicator lamps 176 are turned off. At this time point, the management control device 50 determines a total increase amount in the collecting portion using the RFID again, and compares the total increase amount and the total calculation-based collection amount calculated on the basis of the game result and details of bets of all losers. If both amounts match each other, the indicator lamp 174 is turned on.

Here, the management control device 50 calculates a difference between the total amount of the game tokens in the storing portion 170 obtained using the RFID before starting the collection stage after completion of the game and the total amount of the game tokens in the storing portion 170 obtained using the RFID after completion of the collection, in order to obtain a total RFID-based collection amount. The dealer can recognize that the collection of the game tokens is accurately completed by checking the turn-on state of the indicator lamp 174.

Note that the management control device 50 determines whether or not the image-based collection amount determined on the basis of the image from the camera device 2, the RFID-based collection amount determined on the basis of the radio waves received from the antenna 177, and the calculation-based collection amount calculated on the basis of the game result and details of the bets of the losers match each other in aforementioned description. Alternatively, the management control device 50 may determine only whether or not the image-based collection amount matches the calculation-based collection amount or only whether or not the RFID-based collection amount matches the calculation-based collection amount.

In the aforementioned description, the management control device 50 determines a total increase amount using the RFID again if it is determined that the collection is completed for all losers. In addition, the management control device 50 turns on the indicator lamp 174 if the total increase amount matches the total calculation-based collection amount. Alternatively, the management control device 50 may operate as follows. Specifically, the management control device 50 stores the RFID information read whenever there is a change in the amount of the game tokens 120 in the game token tray 17 as described above. In addition, the management control device 50 may determine a total increase amount whenever there is a change in the amount of the game tokens 120 in the game token tray 17 and determine whether or not the total increase amount matches the total calculation-based collection amount. Furthermore, the management control device 50 may turn on the indicator lamp 174 when it is determined that both the amounts match each other.

Next, the dealer pays for the winner (payout stage). If the collection for all of the losers is completed, the management control device 50 turns on the indicator lamp 176 corresponding to the player for which the game tokens are to be paid out. The dealer can recognize the player to be paid out by checking the indicator lamp 176. In the payout stage, the dealer performs the payout by extracting the game tokens corresponding to the payout amount from the storing portion 170 and placing the extracted game tokens on the bet area of the corresponding player.

The management control device 50 determines whether or not the game token is extracted on the bet area and the amount of the extracted game tokens on the basis of the image from the camera device 2 whenever the dealer extracts the game token from the storing portion 170 and places it on the gaming table 4. In addition, the management control device 50 determines the amount of the game tokens extracted from the storing portion 170 (decrease amount) on the basis of the radio waves received via the antenna 177. Here, the management control device 50 obtains, for each player, the decrease amount by calculating a difference of the total amount of the game tokens in the storing portion 170 before and after the payout using the RFID.

The management control device 50 determines whether or not the actual payout amount determined on the basis of the image from the camera device 2 (image-based payout amount), the decrease amount of the game tokens in the storing portion 170 determined on the basis of the radio waves received from the antenna 177 (RFID-based payout amount), and the payout amount of the corresponding winner calculated on the basis of the game result and details of bets (calculation-based payout amount) match each other.

If the image-based payout amount, the RFID-based payout amount, and the calculation-based payout amount match each other, the management control device 50 turns off the corresponding indicator lamp 176. The dealer can recognize that the payout of the game tokens for the corresponding player is accurately completed by checking the turn-off state of the indicator lamp 176.

Meanwhile, if the image-based payout amount, the RFID-based payout amount, and the calculation-based payout amount do not match, the indicator lamp 176 remains in the turn-on state. Therefore, the dealer can recognize that the payout to the corresponding player is not completed.

As the payout of the game tokens for all winners is completed, all the indicator lamps 176 are turned off. At this time point, the management control device 50 determines a total decrease amount in the storing portion 170 using the RFID again, and compares the total decrease amount and the total calculation-based payout amount calculated on the basis of the game result and details of the bets. If both the amounts match each other, the management control device 50 turns on the indicator lamp 174.

Here, the management control device 50 obtains the total RFID-based payout amount by calculating a difference between a total amount of the game tokens in the storing portion 170 obtained using the RFID before starting the payout stage after completion of the collection and a total amount of the game tokens in the storing portion 170 obtained using the RFID after completion of the payout. The dealer can recognize that the payout of the game tokens is accurately completed by checking the turn-on state of the indicator lamp 174.

Note that, in the aforementioned description, the management control device 50 determines whether or not the image-based payout amount determined on the basis of the image from the camera device 2, the RFID-based payout amount determined on the basis of the radio waves received via the antenna 177, and the calculation-based payout amount calculated on the basis of the game result and details of the bet of the corresponding winner totally match each other. Alternatively, the management control device 50 may determine only whether or not the image-based payout amount matches the calculation-based payout amount, or only whether or not the RFID-based payout amount matches the calculation-based payout amount.

In the aforementioned description, the management control device 50 determines the total decrease amount using the RFID again if it is determined that payout for all winners is completed. In addition, the management control device 50 turns on the indicator lamp 174 if the total decrease amount matches the total calculation-based payout amount. Alternatively, the management control device 50 may operate as follows. Specifically, the management control device 50 stores the RFID information read whenever there is a change in the amount of the game tokens 120 in the game token tray 17 as described above. In addition, the management control device 50 may determine the total decrease amount whenever there is a change in the amount of the game tokens 120 in the game token tray 17 and determine whether or not the total decrease amount matches the total calculation-based payout amount. Furthermore, the management control device 50 may turn on the indicator lamp 174 when it is determined that both the amounts match each other.

If the settlement (collection and payout) of the game tokens is completed as described above, the management control device 50 determines whether or not the total change amount of the game tokens in the storing portion 170 through the settlement is correct. Specifically, the management control device 50 obtains a total change amount caused by the settlement (total RFID-based change amount) by calculating a difference between a total amount of the game tokens in the storing portion 170 obtained using the RFID before starting the settlement after completion of the game and a total amount of the game tokens in the storing portion 170 obtained using the RFID after completion of the settlement.

Meanwhile, the management control device 50 calculates the total change amount of the dealer caused by the settlement of the corresponding game on the basis of the game result and details of the bets (total calculation-based change amount). The calculation-based change amount may be obtained by subtracting the total calculation-based payout amount from the calculation-based collection amount. The management control device 50 compares the total RFID-based change amount and the total calculation-based change amount. If both the amounts match each other, the management control device 50 turns on the indicator lamp 174. The dealer can recognize that the settlement of the game tokens in the corresponding game is accurately completed by checking the turn-on state of the indicator lamp 171. Then, the dealer can start the next game.

Next, the indicator lamp 175 will be described. The indicator lamp 175 functions as a pair lamp. In a baccarat game, a player is allowed to bet on "PAIR" in addition to "PLAYER", "BANKER", and "TIE". The "PAIR" means that the first two cards have the same rank. Specifically, the "PAIR" includes "PLAYER PAIR" in which the first two player cards have the same rank and "BANKER PAIR" in which the first two banker cards have the same rank.

In a case where any one of the players is betting on PAIR, and the two cards have the same rank (a pair is established), a predetermined multiplication factor (for example, payment of 11 to 1) of a bet amount of game tokens are paid out for a player who bets the pair regardless of the game result ("PLAYER", "BANKER", or "TIE"). If the pair is not established, all of the game tokens bet on the pair are collected. If the pair is not established when the first four cards (two for player and two for banker) are drawn, the game tokens bet on the pair at that timing are collected.

In a case where a bet is made for the "PAIR", the management control device 50 calculates a total calculation-based collection amount (if the pair is not established) or a total calculation-based payout amount (if the pair established) when the four cards are drawn. In addition, the management control device 50 compares it with the total change amount of the game tokens in the storing portion 170 obtained using the RFID before and after the settlement for the pair. Note that the management control device 50 may recognize whether or not a bet is made on the pair or the bet amount on the basis of the image of the camera device 2.

If the total calculation-based collection amount or the total calculation-based payout amount matches the total change amount of the game tokens in the storing portion 170, the management control device 50 turns on the indicator lamp 175. The dealer can recognize that the settlement for the pair is accurately completed by checking the turn-on state of the indicator lamp 175.

Alternatively, the management control device 50 may turn on the indicator lamp 175 if a bet is made on the pair. The timing for turning on the indicator lamp 175 may be either when the bets conclude or when the four cards are drawn. In this case, the dealer can recognize that it is necessary to perform settlement for the pair by checking the turn-on state of the indicator lamp 175.

In this case, the management control device 50 turns off the indicator lamp 175 if the total calculation-based collection amount or the total calculation-based payout amount matches the total change amount of the game tokens in the storing portion 170. The dealer can recognize that the settlement for the pair is accurately completed by checking the turn-off state of the indicator lamp 175.

Note that, in the baccarat game, a game may conclude by drawing the four cards (two for player cards and two for banker cards), or the fifth card or the subsequent sixth card may be drawn, depending on the ranks of the distributed cards, in some cases. If the game concludes with four draws, the typical settlement described above is performed as soon as the settlement of the pair is finished. If the fifth or subsequent card is drawn, the settlement for the pair is performed after drawing the fourth card. As the settlement for the pair is completed, the fifth card (or the subsequent sixth card) is drawn. As the game concludes, the typical settlement described above is performed.

Note that, in the aforementioned embodiment, during the collection stage, the indicator lamp 176 of the loser whose game tokens are to be collected is turned on, and the indicator lamp 176 is turned off in order of the player for which the collection is completed. Similarly, during the payout stage, the indicator lamp 176 of the winner for which the game tokens are to be paid out is turned on, and the indicator lamp 176 is turned off in order of the player for which the payout is completed. Alternatively, all of the indicator lamps 176 may be turned on by changing color between the winner and the loser at the end of the game.

For example, the indicator lamp 176 corresponding to the loser may be turned on in red, and the indicator lamp 176 corresponding to the winner may be turned on in green. In this case, the dealer can recognize that the collection from all of the losers is accurately completed by checking the turn-off states of all the red indicator lamps 176. In addition, the dealer can recognize that the payout for all the winners is accurately completed by checking the turn-off states of all the green indicator lamps 176.

Figure 4:
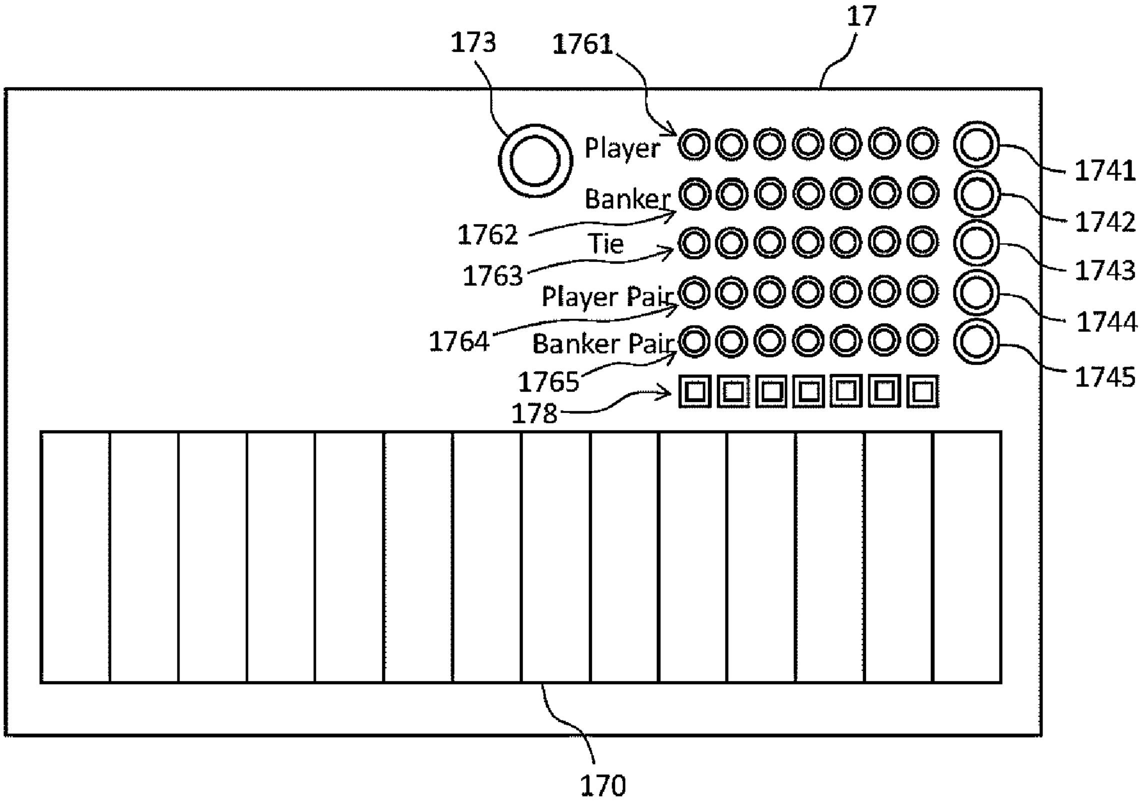
FIG. 4 is a plan view illustrating a game token tray according to a modified example of the first embodiment.

FIG. 4 is a plan view illustrating a game token tray according to a modification. In the game token tray 17 of FIG. 4, like reference numerals denote like elements as in the game token tray 17 of FIG. 2, and they will not be described for simplicity purposes. In the game token tray 17 of this modification, the indicator lamps 1761 to 1765 of each bet target (specifically, the indicator lamp 1761 indicating "PLAYER", the indicator lamp 1762 indicating "BANKER", the indicator lamp 1763 indicating "TIE", the indicator lamp 1764 indicating "PLAYER PAIR", and the indicator lamp 1765 indicating "BANKER PAIR") and the indicator lamp 178 indicating that the settlement is accurately completed are provided for each player position.

The indicator lamps 1761 to 1765 are turned on depending on the bet target of each player (position where the game tokens are placed), and are turned off as the settlement is completed. The indicator lamp 178 is turned on when the settlement is accurately completed for each player.

The game token tray 17 according to the first modification has indicator lamps 1741 to 1745 indicating that the settlement for each bet target (such as "PLAYER", "BANKER" "TIE", "PLAYER PAIR", and "BANKER PAIR") is accurately completed. The game tokens are paid out for any one of "PLAYER", "BANKER", and "TIE", and are collected for the other bets, depending on the game winning/losing result. In addition, if the player pair is established, the game tokens are paid out for "PLAYER PAIR". If the player pair is not established, the game tokens are collected for "PLAYER PAIR". Similarly, if the banker pair is established, the game tokens are paid for "BANKER PAIR". If the banker pair is not established, the game tokens are collected for "BANKER PAIR". The indicator lamps 1741 to 1745 are turned on when the settlement (collection or payout) for each of "PLAYER", "BANKER" "TIE", "PLAYER PAIR", and "BANKER PAIR" is accurately completed.

Figure 5:
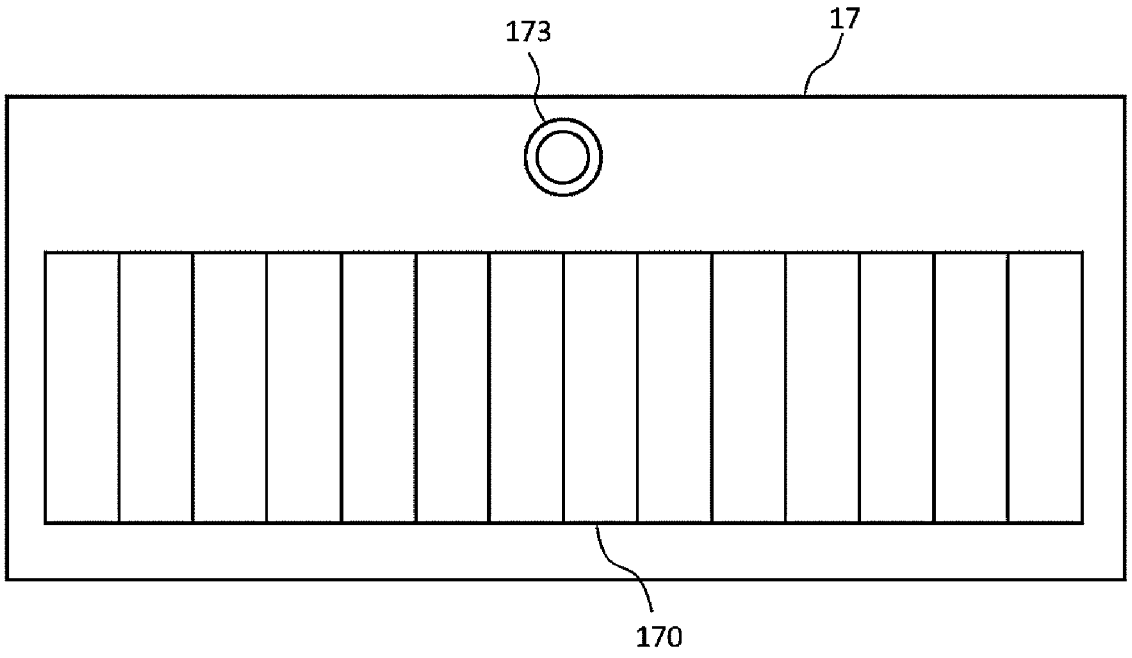
FIG. 5 is a plan view illustrating a game token tray according to a modified example of the first embodiment.

FIG. 5 is a plan view illustrating a game token tray 17 according to another modification. As illustrated in the example of FIG. 5, the game token tray 17 may have only the indicator lamp 173 indicating whether or not the balance between the collected amount and the paid amount is correct.

Figure 6:
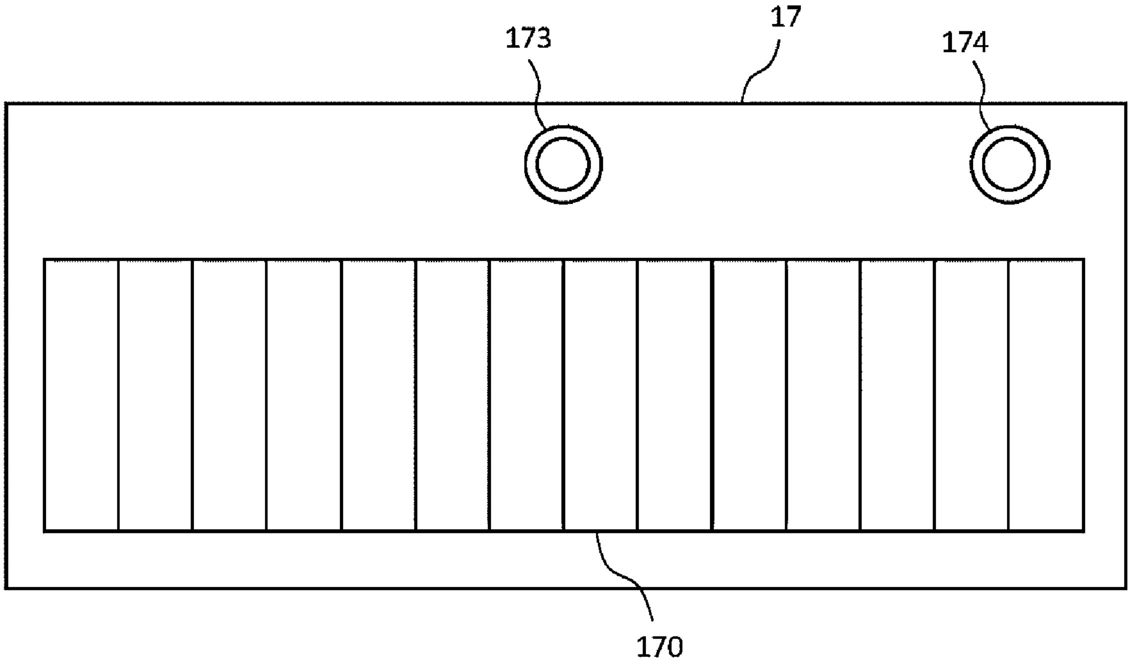
FIG. 6 is a plan view illustrating the game token tray according to the first embodiment.

FIG. 6 is a plan view illustrating a game token tray 17 according to further another modification. As illustrated in FIG. 6, the game token tray 17 may have an indicator lamp 173 indicating whether or not the balance between the collected amount and the paid amount is correct and the indicator lamp 174 indicating whether or not a total collected amount is correct and whether or not a total paid amount is correct.

Note that, in the aforementioned embodiment and its modifications, the management control device 50 determines the amount of game tokens stored in the game token tray 17 by wirelessly reading the information from the RFID embedded in the game token using the RFID embedded in the game token and the antenna 177 embedded under the game token tray 17. Alternatively, the management control device 50 may determine the amount of the game tokens stored in the game token tray 17 by providing a camera device for photographing the game tokens stored in the game token tray 17 and recognizing the image of the camera device. In this case, the game token may not have the RFID.

In the aforementioned embodiment, a plurality of indicator lamps including the indicator lamp 173 are physically realized as lamps. Alternatively, such lamps may be provided as images on a display device such as a liquid crystal panel.

In the aforementioned embodiment, the information regarding the type and the number of the game tokens 120 stored in the game token tray 17 is determined by reading the RFID embedded in the game token 120. Alternatively or additionally, the information regarding the type and the number of the game tokens 120 stored in the game token tray 17 may be determined by providing a camera device for photographing the game tokens 120 stored in the game token tray 17 and recognizing the image using the management control device 50. In this case, as the camera device for photographing the game token tray 17, the camera device 2 described above may be commonly used, or a dedicated camera device may be provided.

In a case where image recognition is performed for the image of the camera device in addition to the RFID reading, the game tokens 120 may be verified by comparing the number of the game tokens 120 obtained through the RFID reading with the number of the game tokens determined through the image recognition. If the RFID of the game token tray 17 is failed, or the stored game token has no RFID (wrongful game token), the number determined through the image recognition becomes larger than the number determined through the RFID reading. Therefore, in the case of such discrepancy occurs, the management control device 50 turns on the indicator lamp, so that the dealer can recognize that a wrongful game token is contained in the game token tray 17 by checking the indicator lamp.

In particular, in a case where a discrepancy in the number of the game tokens occurs as a result of performing the RFID reading and the image recognition at a predetermined time interval and performing the aforementioned comparison whenever the information is updated, it is recognized that such a discrepancy is caused by the game token 120 recently added to the game token tray 17. Therefore, it is possible to identify a player who has a wrongful game token.

The management control device 50 may verify that the corresponding game tokens do not exist on the gaming table as the dealer collects the game tokens from the gaming table. In this case, specifically, the management control device 50 determines how much game tokens are bet on which bet target and what is the type of the game tokens on the basis of the image from the camera device 2, determines the amount to be collected in accordance with the game rule according to the game result of the card distribution device 3 (calculation-based collection amount), and verifies that the game tokens 120 corresponding to the calculation-based collection amount do not exist on the gaming table 4 on the basis of the image from the camera device 2.

The management control device 50 may verify whether or not the collection is accurately performed by comparing the amount of the game tokens that do not exist on the gaming table 4 (image-based collection amount) with the amount of the game tokens added to the game token tray 17 on the basis of the image from the camera device 2 described above. In this case, if both the amounts do not match as a result of the comparison, the management control device 50 turns on the indicator lamp.

The management control device 50 may verify that the corresponding game tokens exist on the gaming table as a result that the dealer pays out the game tokens on the gaming table. In this case, specifically, the management control device 50 determines how much game tokens are bet on which bet target and what is the type of the game tokens on the basis of the image from the camera device 2, determines the amount to be paid out in accordance with the game rule according to the game result of the card distribution device 3 (calculation-based payout amount), and verifies that the game tokens 120 corresponding to the calculation-based payout amount are added on the gaming table 4 on the basis of the image from the camera device 2.

The management control device 50 may verify whether or not the payout is accurately performed by comparing the amount of the game tokens added on the gaming table 4 (image-based payout amount) and the amount of the game tokens extracted from the game token tray 17 on the basis of the image from the camera device 2 described above. In this case, if both the amounts do not match as a result of the comparison, the management control device 50 turns on the indicator lamp.

As described above, the dealer basically collects the game tokens 120 bet by the losers in order of the player position number. The management control device 50 determines whether or not the dealer takes the chips in accordance with this rule (in order of the player position number) and also determines whether or not the amount of the chips sequentially collected is correct. In this case, the management control device 50 determines how far the dealer collects the game tokens (what is the player position at which collection of the game tokens is currently performed) in addition to the individual player position and all of the player positions, and accordingly determines whether or not the game tokens 120 collected from the gaming table 4 in each stage are reliably added to the game token tray 17. For example, when the game tokens 120 are collected from three positions, the management control device 50 determines whether or not the game tokens 120 are reliably stored in the game token tray 17 from three positions.

As described above, according to this embodiment and its modifications, the indicator lamp 173 or the like is provided to indicate whether a change of the game tokens in the game token tray 17 after an end of the game is accurate and/or inaccurate. Therefore, it is possible to recognize, in real time, whether or not settlement is accurately performed at the time of the settlement.

While various embodiments of the invention have been described hereinbefore, a person ordinarily skilled in the art would modify them within the scope of the invention. In addition, the devices according to the embodiments may be appropriately modified as necessary depending on an applied game.

Figure 7:
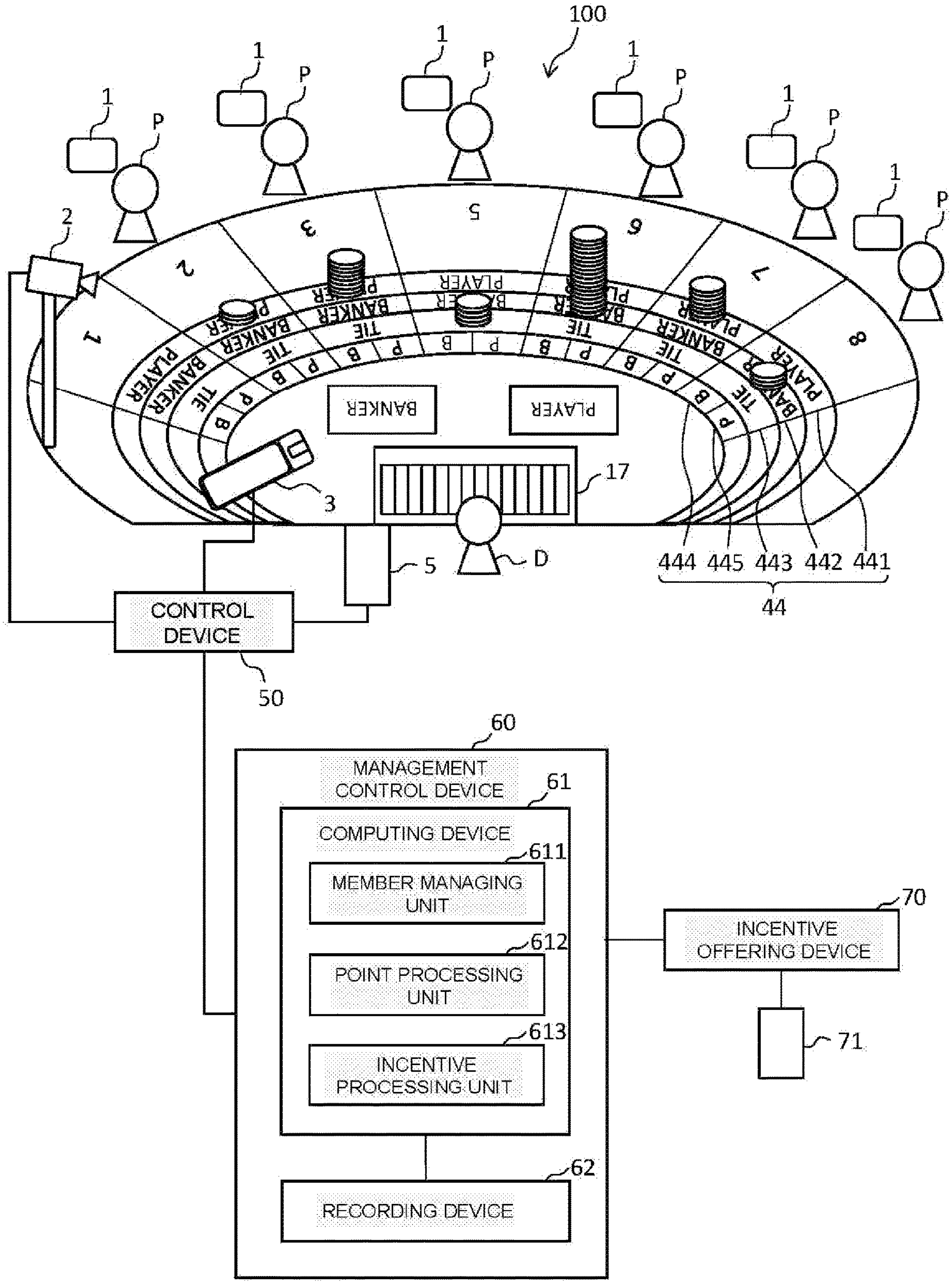
FIG. 7 is a diagram illustrating a configuration of a game management system according to a second embodiment.

In a second embodiment, a game management system for carrying out a point service will be described. FIG. 7 is a diagram illustrating a configuration of a game management system according to this embodiment. A game management system 100 is installed in casino facilities and manages casino games which are carried out in the casino facilities. In the casino facilities, a plurality of gaming tables 4 for playing a game using game tokens 9 is provided.

The configurations of the gaming table 4 and a camera 2, a card distribution device 3, a game token tray 17, and a control device 50 which are provided in the gaming table 4 are the same as in the first embodiment. That is, similarly to the first embodiment, the control device 50 identifies a position (a player position and a bet target), a type, and the number of game tokens placed in a bet area on the basis of an image captured by the camera 2 and calculates a bet amount from the identified type and number of game tokens for each player position.

The control device 50 ascertains positions, types, and numbers of game tokens 9 on the gaming table 4, receives a winning/losing result from the card distribution device 3 serving as a winning/losing determination device, and calculates a collection amount and a payout amount for each player position on the basis of the winning/losing result and the calculated bet amount for each player position.

In each gaming table 4 in this embodiment, a reader/writer device 5 is additionally provided at a dealer position. The reader/writer device 5 is connected to the control device 50. The control device 50 of each gaming table 4 is connected to a management control device 60 to communicate therewith in a wired or wireless manner. That is, the management control device 60 is connected to the control devices 50 of a plurality of gaming tables 4.

Figure 8:
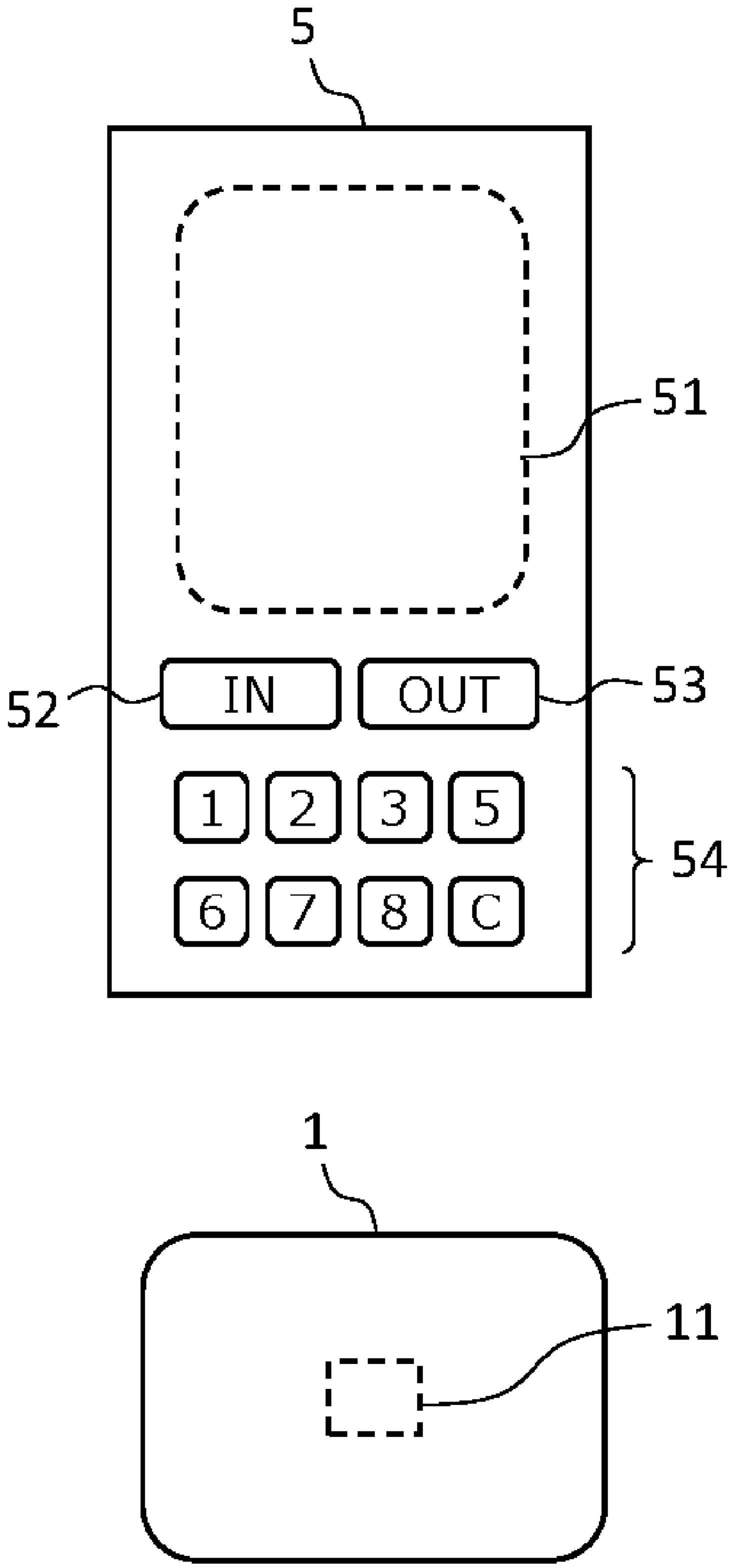
FIG. 8 is a diagram illustrating a reader/writer device and a member card in the second embodiment.

FIG. 8 is a diagram illustrating the reader/writer device 5 and a member card 1. The member card 1 is a plastic card and has an RF tag 11 incorporated therein. A member ID which is given to a player (a member) through member registration which will be described later, points held by the corresponding player (held points), and the like are stored in the RF tag 11. An antenna is provided in the RF tag 11 and information can be written and read in a noncontact manner using the reader/writer device 5.

The reader/writer device 5 includes a radio unit 51, a seating button 52, a seat-leaving button 53, and a position designation button 54. The radio unit 51 performs writing and reading information to and from the RF tag 11 incorporated into the member card 1 in an RFID manner. The position designation button 54 includes buttons "1", "2", "3", "5", "6", "7", and "8" corresponding to seven positions of the gaming table 4 and a button "C" for cancelling designation.

Figure 9:
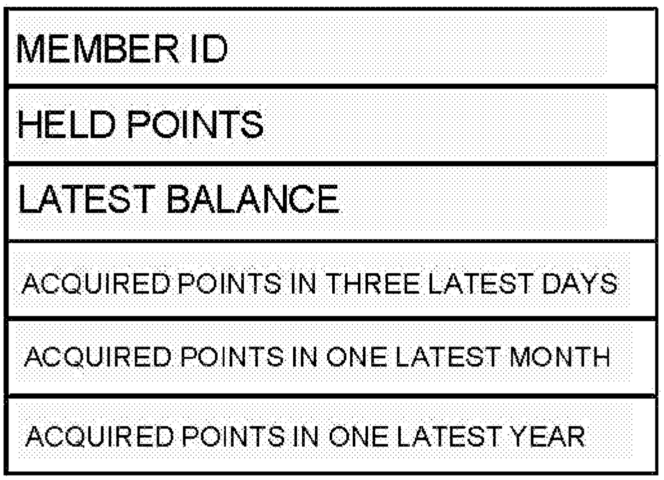
FIG. 9 is a diagram illustrating information which is stored in a member card in the second embodiment.

FIG. 9 is a diagram illustrating information which is stored in the member card 1. In the member card 1, a member ID, held points, a latest balance, points acquired in three latest days, points acquired in one latest month, and points acquired in one latest year are stored. As the latest balance, the total value of a payout amount (plus) and a collected amount (minus) between the previous seating and the previous seat leaving is written.

When a player arrives at a player position of the gaming table 4, a dealer D receives the member card 1 from the player and causes the reader/writer device 5 to read the member card 1. Specifically, the dealer D presses the position designation button 54 of the corresponding player position, presses the seating button 52, and holds the member card 1 up over the radio unit 51 to read information stored in the member card 1. Accordingly, the reader/writer device 5 can identify the player located in each player position using the member ID and the reader/writer device 5 serves as a player identifying unit.

The reader/writer device 5 outputs (transmits) the information read by the radio unit 51, a seating signal based on the pressing of the seating button 52, and information of the player position in which the player corresponding to the member ID is seated to the control device 50. The control device 50 records the information received from the reader/writer device 5 and records a time at which the seating signal has been received as a start time. The start time is stored in the form of date and time. The control device 50 transmits the information of the start time and the member ID received from the reader/writer device 5 to the management control device 60.

The control device 50 ascertains at which player position a player with a certain member ID plays a game on the basis of the member ID and the information of the player position received from the reader/writer device 5. While a player is playing a game a plurality of times, the control device 50 calculates and records a bet amount, a payout amount, and a collected amount for each member ID.

When a player leaves the gaming table 4, the dealer D causes the reader/writer device 5 to read the member card 1 received from the player. In this case, the dealer D presses the seat-leaving button 53 and holds the member card 1 up over the radio unit 51 to read the member ID from the member card 1.

The reader/writer device 5 outputs (transmits) the member ID and the seat-leaving signal to the control device 50. When the member ID and the seat-leaving signal are received from the reader/writer device 5, the control device 50 records the time at which the seat-leaving signal has been received as an end time. The end time is stored in the format of date and time. The control device 50 calculates a cumulative bet amount and a cumulative balance from the start time to the end time for the member ID. The control device 50 calculates acquired points on the basis of the cumulative bet amount from the start time to the end time.

The control device 50 adds the calculated acquired points to the held points read from the member card 1 at the time of seating to update the held points. All of the acquired points in three latest days, the acquired points in one latest month, and the acquired points in one latest year are updated on the basis of the calculated acquired points. The control device 50 outputs the updated held points, the acquired points in three latest days, the acquired points in one latest month, the acquired points in one latest year, and the cumulative balance from the start time to the end time to the reader/writer device 5. The reader/writer device 5 rewrites the output information over the information of the member card 1. Note that, the cumulative balance from the start time to the end time is stored as the latest balance.

By the above-mentioned functions of the control device 50 and the reader/writer device 5, points based on an actual bet amount can be offered to the member card 1 and a player can store the held points in the member card 1.

The management control device 60 includes a computing device 61 and a recording device 62. In the computing device 61, the following functions are embodied by causing a computer to execute a predetermined program. That is, the computing device 61 includes a member managing unit 611, a point processing unit 612, and an incentive processing unit 613.

The recording device 62 is used as a database in which information of members is stored. FIG. 10 is a diagram illustrating information of each member which is stored in the recording device 62. The recording device 62 stores information stored in the member card 1, that is, all of the member ID, the held points, the latest balance, the acquired points in three latest days, the acquired points in one latest month, and the acquired points in one latest year, for each member. In the recording device 62, member information (nationality, name, passport number, registration date, and the like) and a play result are further stored. As the play result, a start time, an end time, a cumulative bet amount from seating to seat leaving, and a balance from seating to seat leaving are added whenever the player seats and then leaves a seat.

The member managing unit 611 receives member information (nationality, name, passport number, registration date, and the like) required for member registration from an input device which is not illustrated or another device communicatively connected thereto and performs member registration. At this time, the member managing unit 611 gives a member ID for identifying a member. The member ID is written to the member card 1 and is stored in the recording device 62 along with the member information.

As described above, when a player leaves the gaming table 4, the control device 50 outputs the updated held points, the acquired points in three latest days, the acquired points in one latest month, the acquired points in one latest year, and the cumulative balance from the start time to the end time to the reader/writer device 5 and also outputs this information to the management control device 60. The control device 50 also transmits the play result to the management control device 60.

The point processing unit 612 updates information of the corresponding member ID stored in the recording device 62 on the basis of information transmitted from the control device 50. Note that, the play result is additionally written without rewriting the past play results. Accordingly, a history of the play results of each player is stored in the recording device 62.

With this configuration, the held points based on the bet amount are written to the member card 1, and points based on the bet amount are written to the recording device 62 as a database for each member.

The held points can be exchanged for an incentive. The incentive processing unit 613 performs a process of exchanging the held points for an incentive. Incentives which can be offered according to the held points are stored in the recording device 62.

FIG. 11 is a diagram illustrating a relationship between incentives, the number of consumption points, and offering conditions which is stored in the recording device 62. The offering conditions include a condition that the latest balance is equal to or greater than a predetermined amount (plus), a condition that the latest balance is equal to or less than a predetermined amount (minus), a condition that the acquired points in three latest days is equal to or greater than a predetermined value, a condition that the acquired points in one latest month is equal to greater than a predetermined value, a condition that the acquired points in one latest year is equal to or greater than a predetermined value, and the like. The latest balance may be a winning amount—a losing amount of a member in a predetermined period such as one week or one month as well as from previous seating to previous seat leaving and may be referred to as a net profit of the member.

For example, an incentive which can be immediately used such as a service of a hotel for promoting a long stay (for example, postponement of the checkout date of a hotel in which a player stays or upgrade of a room) can be effectively offered to the member of which the latest balance is equal to or greater than a predetermined amount such that the member stays in the casino facility after the next day and can participate in a game. Accordingly, offering conditions that the latest balance is equal to or greater than a predetermined amount are added to the incentives such as postponement of the checkout date of a hotel in which a player stays or upgrade of a room.

On the other hand, when the latest balance of a member is equal to or less than a predetermined amount, time-limit chips which can be used after a predetermined period has elapsed or coupons which can be used in the casino facility can be effectively offered. Accordingly, offering conditions that the latest balance is equal to or less than a predetermined amount are added to the incentives such as time-limit chips which can be used after a predetermined period has elapsed or coupons which can be used in the casino facility. The incentives may include an incentive to which offering conditions are not set and which is achieved by only consuming points.

A game promoter acquires a profit when a value obtained by subtracting an amount of loss from a total profit of the game promoter is a plus value, and the game promoter has a loss when the value is a minus value. The value obtained by subtracting an amount of loss from a total profit of a game promoter is referred to as a net profit of the game promoter, and it is desirable that the costs of the game promoter associated with the incentives offered to members be determined according to the net profit as a whole.

A user uses the member card 1 when exchanging the held points for an incentive. Accordingly, an incentive offering device 70 is used. The incentive offering device 70 is a device that is used in a place in which an incentive is offered by consuming held points and is communicatively connected to the management control device 60. A communication network between the incentive offering device 70 and the management control device 60 may include the Internet.

A reader/writer device 71 is connected to the incentive offering device 70. The reader/writer device 71 reads all information such as a member ID and held points from the member card 1 and outputs the read information to the incentive offering device 70. The incentive offering device 70 receives an incentive which is desired by a member. The incentive offering device 70 transmits a request for an incentive to the management control device 60 along with information of the member card 1 and information for identifying the incentive offering device 70.

The incentive processing unit 613 determines whether or not the held points of the corresponding member ID is sufficient for the number of consumption points corresponding to the score thereof or whether an offering condition is satisfied when the offering condition is set, for the requested incentive with reference to the recording device 62 on the basis of the information.

When there are sufficient held points and an offering condition is satisfied, the incentive processing unit 613 updates the points by subtracting the number of points corresponding to the incentive from the held points. The incentive processing unit 613 allows the incentive offering device 70 to offer the incentive and stores the number of points consumed by causing the incentive offering device 70 to offer the incentive in the recording device 62.

The point processing unit 612 rewrites the held points of the recording device 62 with the held points updated by offering the incentive and transmits the updated held points to the incentive offering device 70. The incentive offering device 70 outputs the updated held points to the reader/writer device 71 and the reader/writer device 71 rewrites the held points stored in the member card 1.

The incentive offering device 70 may be installed in a casino facility, an associated hotel, or a predetermined facility. When the incentive offering device 70 is installed in a casino facility, the point service may be a right to enter a VIP room or unrealizable game tokens. In this case, the incentive processing unit 613 may offer the right to enter a VIP room in exchange for a predetermined number of points or may offer unrealizable game tokens corresponding to the number of points when the held points are equal to or greater than a predetermined amount. When the incentive offering device 70 is installed in a hotel, the point service may be a hotel service. In this case, consumption points are defined for each hotel service in the incentive processing unit 613 and points may be consumed according to the services.

As described above, according to this embodiment, since an actual bet amount of each member in a game can be automatically acquired and can be reflected in points, it is possible to reliably offer points based on a bet amount of each player.

In the second embodiment, information such as held points of each member is stored in the member card 1 and the recording device 62 of the management control device 60 and both information such as the held points stored in the member card 1 and information such as the held points stored in the recording device 62 are updated whenever a member participates in a game and consumes points, but information such as the held points may be stored in only one of the member card 1 and the recording device 62. When information such as the held points is stored in the recording device 62, only the member ID may be stored in the member card 1. In this case, the member card 1 may be used to identify a player by reading the member card 1 at the time of seating and at the time of seat leaving as described above.

Figure 12:
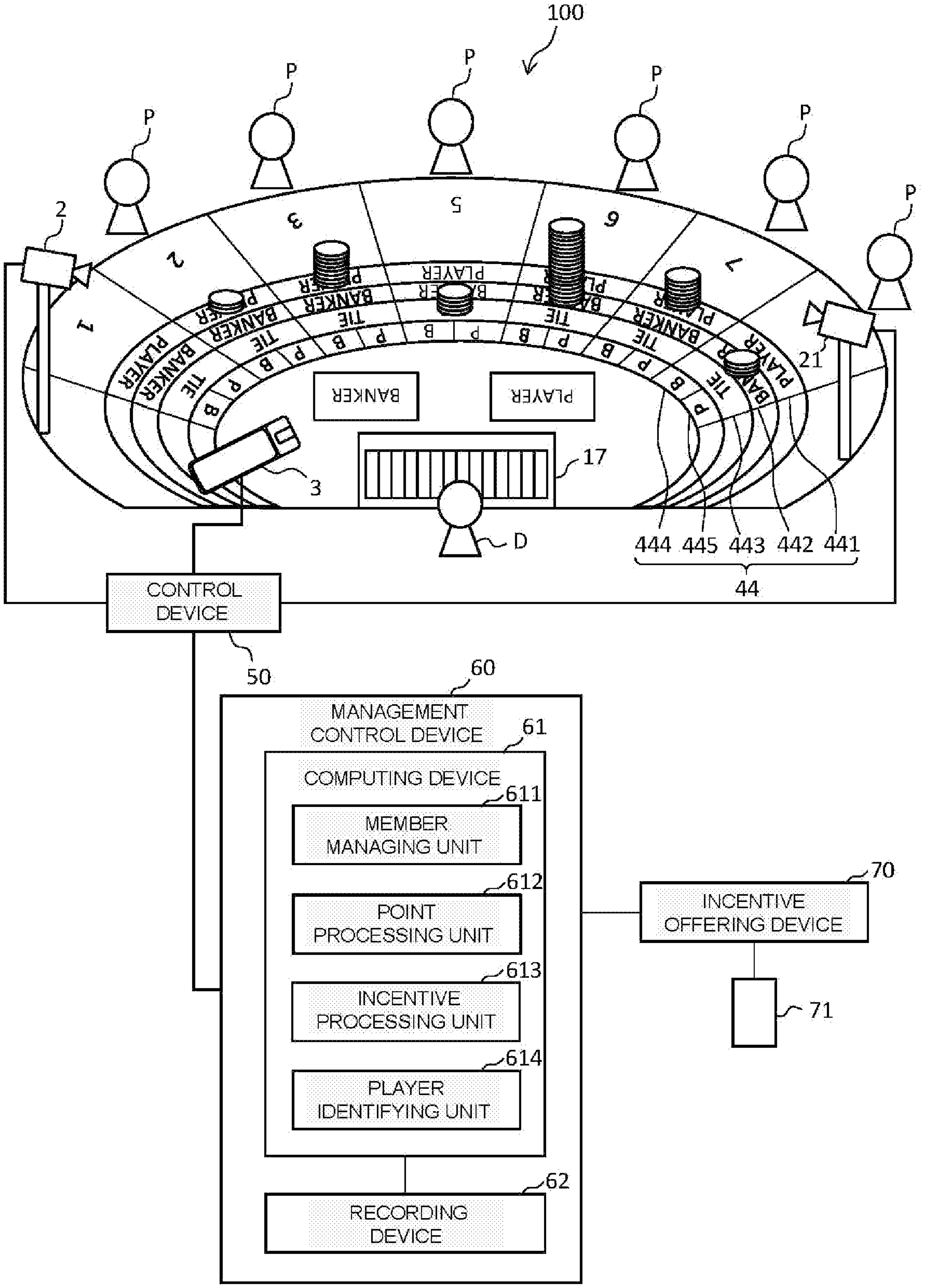
FIG. 12 is a diagram illustrating a modified example of a player identifying unit in the second embodiment.

In the second embodiment and Modified Example 1 thereof, a player who is seated in each player position is identified using the member card, but the method of identifying a player is not limited thereto. FIG. 12 is a diagram illustrating a modified example of the player identifying unit. As illustrated in FIG. 12, in a game management system according to this modified example, a camera 21 for imaging faces of players who are located in player positions are provided in addition to the camera 2 for imaging bet areas.

The camera 21 photographs a face of a player in a player position, generates a face image, and outputs the face image to the control device 50. The control device 50 transmits the face image to the management control device 60. The computing device 61 of the management control device 60 includes a player identifying unit 614. The player identifying unit 614 identifies a player by performing image analysis on the face image. Accordingly, the member managing unit 611 acquires a face image of a member in correlation with the member ID and stores the acquired face image in the recording device 62 at the time of member registration.

An arbitrary existing face authentication technique such as analysis using principal component analysis, analysis using deep learning, or analysis using a hidden Markov model can be used for the image analysis in the player identifying unit 614, or analysis using a moving image or analysis using three-dimensional image may be used. A face authentication system serving as a player identifying unit is constituted by the camera 21 and the player identifying unit 614.

Figure 13:
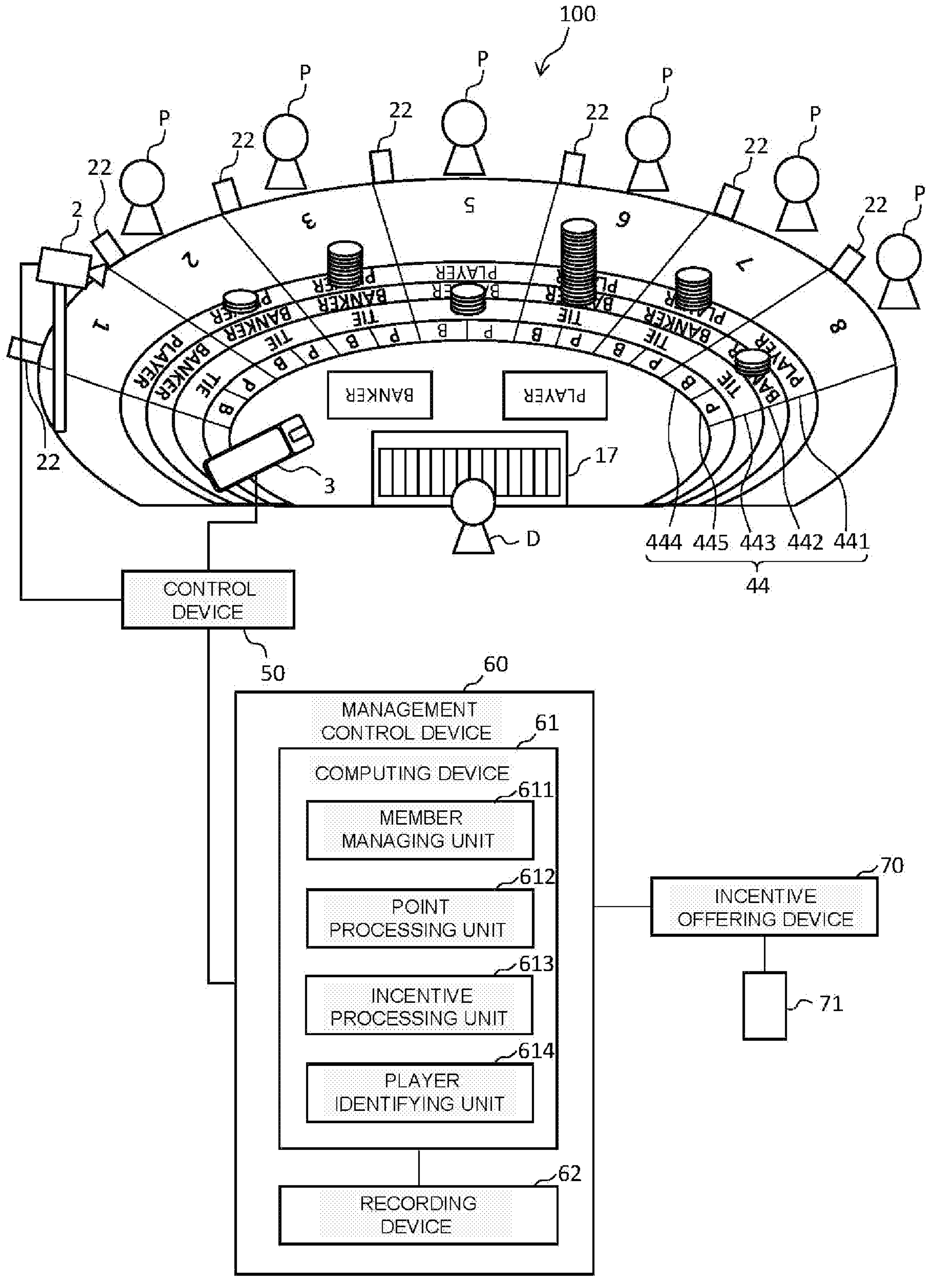
FIG. 13 is a diagram illustrating another modified example of the player identifying unit according to the second embodiment.

FIG. 13 is a diagram illustrating another modified example of the player identifying unit. In this modified example, a fingerprint reader device 22 is provided in each player position as means for identifying a player. Although not illustrated, each fingerprint reader device 22 is connected to the control device 50. An arbitrary existing fingerprint reader device can be used as the fingerprint reader device 22.

A player causes the fingerprint reader device 22 to read a fingerprint at the time of seating and at the time of seat leaving. When a fingerprint is read, the fingerprint reader device 22 outputs information of the read fingerprint to the control device 50. The control device 50 transmits information of the fingerprint to the management control device 60. The player identifying unit 614 according to this modified example identifies a player through a fingerprint authentication technique. Accordingly, a player reads a fingerprint thereof and stores the information thereof in the recording device 62 at the time of member registration. In this modified example, a fingerprint authentication system serving as the player identifying unit is constituted by the fingerprint reader device 22 and the player identifying unit 614.

The player identifying unit in the present disclosure may identify a player by performing other biometric authentication such as finger vein authentication, iris authentication, voiceprint authentication in addition to the face authentication or the fingerprint authentication.

In the reader/writer device 5, the seating button 52, the seat-leaving button 53, and the position designation button 54 may be embodied by a touch panel.

In the above-mentioned embodiments, the control device 50 calculates a payout amount and a collected amount on the basis of the bet amount recognized by image analysis and the winning/losing result from the card distribution device 3, but the type or the number of game tokens which are actually paid or collected on the gaming table 4 may be recognized by analyzing an image or a video to calculate the payout amount and the collected amount.

In the above-mentioned embodiments, some or all of the functions of the control device 50 which is provided for each gaming table 4 may be included in the management control device 60 or some or all of the functions of the computing device 61 of the management control device 60 may be included in the control device 50 provided in each gaming table 4.

In the above-mentioned embodiments, the member managing unit 611 may store information of a class of a member as member information and the incentive processing unit 613 may change a status of a member according to the number of held points thereof. A status as incentive information (see FIG. 11) may be stored in the recording device 62. Accordingly, it is possible to set an incentive such as invitation of a member of a high status to a VIP room.

When the held points reach a predetermined amount, bonus points may be offered. Alternatively, when points acquired within a predetermined period (for example, a day, several days, or one month) are equal to or greater than a predetermined value, bonus points may be offered. That is, bonus points may be offered to a member who has comprehensively acquired points within a predetermined period.

In the above-mentioned embodiments, at a time at which a player leaves a seat, a cumulative bet amount and a cumulative balance from seating to seat leaving are transmitted from the control device 50 to the management control device 60 and the reader/writer device 5 and are written to the recording device 62 and the member card 1. However, instead, the bet amount and the balance (the payout amount or the collected amount) in each game from seating to seat leaving may be written to the recording device 62 and the member card 1. When a game concludes, the bet amount and the balance (the payout amount or the collected amount) in the game may be transmitted from the control device 50 to the management control device 60 and the reader/writer device 5 and be written to the recording device 62 and the member card 1.

The cumulative bet amount and the cumulative balance of each member stored in the recording device 62 can be used as credit information. For example, it is possible to determine that a member of which the cumulative bet amount is greater has funds power or that a member of which the balance is much less than the cumulative bet amount has a high risk.

The computing device 61 may store a net profit (that is, a cumulative profit) of a game promoter side (the casino side) in a predetermined time (for example, every hour) or period (for example, every day or every month) in the recording device 62 and read the net profit from the recording device 62 if necessary. Information of the net profit can be used for business judgment of the casino.

When the total increase/decrease amount of the game token tray 17 before and after settlement of the game tokens 9 and the total amount of the balance of each player match each other as the result of comparison, the control device 50 may be configured to offer points to the player. With this configuration, it is possible to ascertain that payment or collection of the game tokens 9 has been accurately performed by the settlement and thus to offer points.

What is claimed:

1. A game management system for management of a casino game played in a casino facility, the game management system comprising:

a gaming table that includes a plurality of player positions and a betting target;

a game token tray configured to accommodate game tokens; and at least one processing device configured to, for a player of one or more players that is at a player position of the plurality of player positions:

identify positions, types, and numbers of game tokens that have been placed in the betting target as a bet for playing a game for the player by analyzing an image of the game tokens captured by a camera;

calculate a bet amount of the bet by the player based on the identified positions, types, and numbers of the game tokens;

determine an identity of the player that is participating in the game;

identify a member ID of the player;

store, in a database, in association with each other, (a) the member ID of the player that is determined and (b) the bet amount that is calculated of the player in a history of a plurality of bet amounts by the player, wherein (a) and (b) are stored in association with each other based on determining the identity of the player; and store, in the database, in association with the member ID of the player, an accumulated amount of the plurality of bet amounts, wherein the at least one processing device is further configured to:

determine a result of the game;

determine a total amount of the game tokens that are in the game token tray;

for each player of the one or more players:

determine a winning/losing status and a balance of the player based on the result of the game and the bet amount of the bet by the player;

compare a total amount of the balance of the player with a total increase/decrease of the total amount of the game tokens that are in the game token tray between before and after settlement of the game tokens;

assign points to the player based on the bet amount of the bet by the player; and transmit the points to the player when the total increase/decrease and the total amount of the balance match each other as a result of the comparison.

2. The game management system according to claim 1, further comprising a player identifying system configured to, for each player of the one or more players, identify a seating and a seat leaving of the player by reading a member card of the player.

3. The game management system according to claim 1, wherein the at least one processing device includes a face authentication system for identification of the one or more players.

4. The game management system according to claim 1, wherein the at least one processing device includes a reader device configured to read the member ID of the player from a storage medium carried by the player.

5. The game management system according to claim 1, wherein the at least one processing device is configured to, for the player, ascertain and store in the database a start time and an end time of participation in the game by the player.

6. The game management system according to claim 1, wherein the at least one processing device is configured to calculate for each player of the one or more players, respective bet amounts for each of a plurality of games.

7. The game management system according to claim 1, wherein the at least one processing device is configured to generate an incentive based on an accumulation of bet amounts over a month or year.

8. The game management system according to claim 1, wherein the at least one processing device is configured to generate an incentive based on an accumulation of bet amounts over a period of a predefined number of successive days.

9. The game management system according to claim 1, wherein:

the identification is performed based on an analysis of an image of the game tokens captured by the camera;

each player of the one or more players that is participating in the game is determined based on at least one video of the one or more players; and the member ID of the player is identified based on the player being determined based on the at least one video.

10. A game management system comprising:

a game token tray configured to accommodate game tokens;

a camera configured to capture an image of game tokens bet in the game by a player of one or more players participating in a game, wherein the player is at a player position of a game table in a casino facility and the camera is further configured to capture a three-dimensional image or video of the player at the player position; and at least one processing device that is configured to:

identify the one or more players;

determine an identity of the player of the one or more players that is participating in the game; and for the player at the player position:

identify, based on performance of an image analysis on the image of game tokens, positions and types of the game tokens that have been placed as a bet by the player;

calculate a bet amount of the bet by the player based on the identified positions and types of the game tokens;

record the bet amount calculated in a history of a plurality of bet amounts by the player; and record an accumulated amount of the plurality of bet amounts subsequent to recording the bet amount in the history, wherein the at least one processing device is further configured to:

determine a result of the game;

determine a total amount of the game tokens that are in the game token tray;

for each player of the one or more players:

determine a winning/losing status and a balance of the player based on the result of the game and the bet amount of the bet by the player;

compare a total amount of the balance of the player with a total increase/decrease of the total amount of the game tokens that are in the game token tray between before and after settlement of the game tokens;

assign points to the player based on the bet amount of the bet by the player; and transmit the points to the player when the total increase/decrease and the total amount of the balance match each other as a result of the comparison.

11. The game management system according to claim 10, wherein the at least one processing device is configured to record the points in a storage medium configured to be carried by the player.

12. The game management system according to claim 10, wherein the at least one processing device is configured to output a total bet amount of the player as credit information of the player.

13. The game management system according to claim 10, further comprising a database, wherein the points of the player are recorded in the database by the at least one processing device.

14. The game management system according to claim 10, wherein the at least one processing device is configured to generate an incentive to the player based on the points recorded for the player.

15. The game management system according to claim 10, wherein:

the game management system is configured to manage a plurality of gaming tables;

the at least one processing device is configured to:

determine a total bet amount for the player in a predetermined time or period, a net profit for the player in the predetermined time or period, or a net profit of a game promoter in the predetermined time or period;

generate points or status for the player according to a predetermined condition based on the total bet amount of the player, the net profit of the player, or the net profit of the game promoter; and output the points or status that is generated.

16. The game management system according to claim 15, wherein the predetermined time or period is a day, a predefined number of successive days, or a month.

17. The game management system according to claim 15, wherein the at least one processing device is configured to additionally generate points or status when the points are collectively generated in the predetermined time or period.

18. The game management system according to claim 15, wherein the at least one processing device is configured to output an offer of a right to enter a very- important-person ("VIP") room based on the points or status.

19. The game management system according to claim 15, wherein the points or status is exchangeable for unrealizable game tokens.

20. The game management system according to claim 15, wherein the points or status is usable for paying a usage fee for a hotel or a predetermined facility.

* * * * *